Patented Aug. 20, 1935

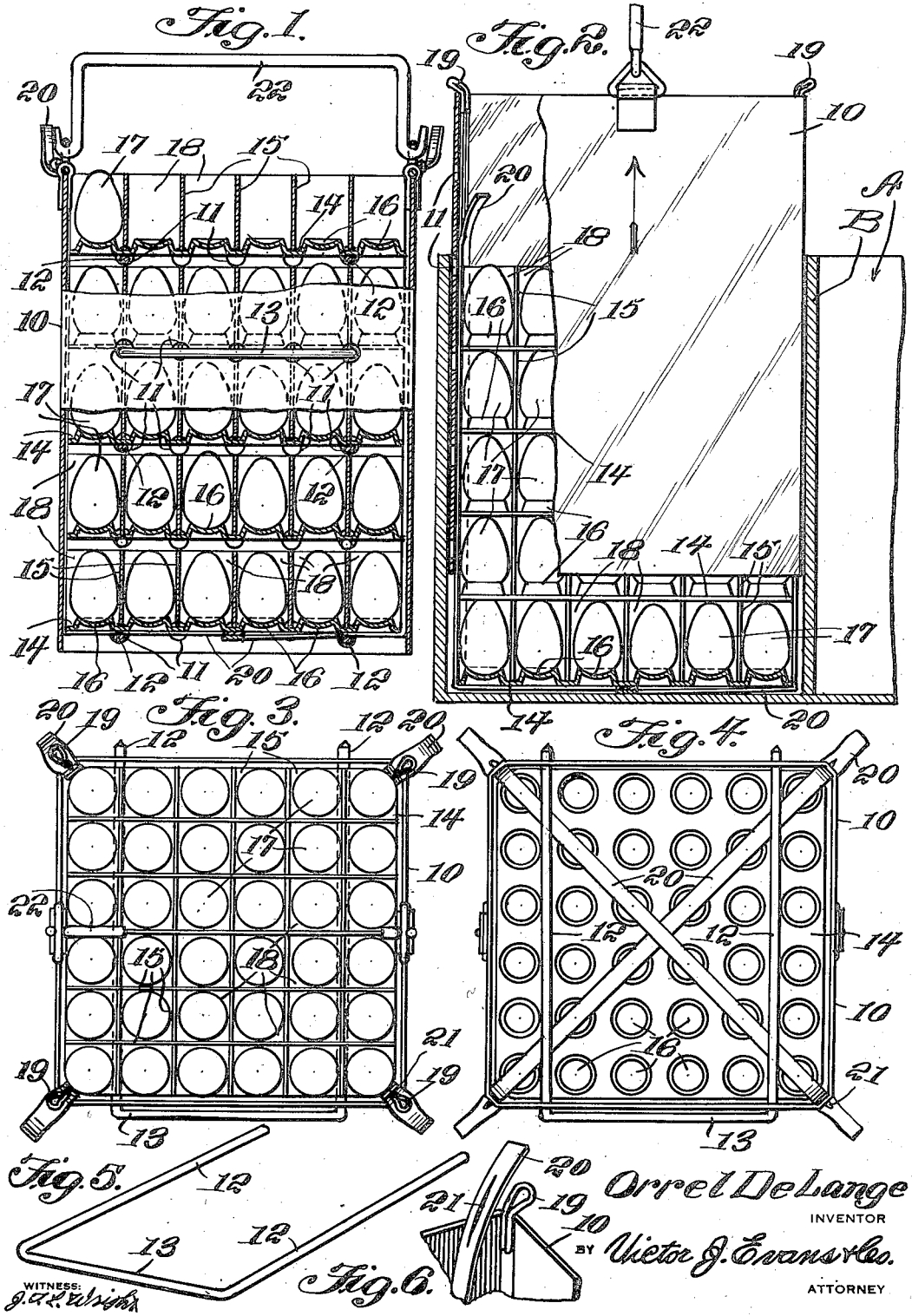

2,011,892

UNITED STATES PATENT OFFICE 2,011,892

EGG CRATE PACKING DEVICE

Orrel De Lange, Provo, Utah

Application July 2, 1934, Serial No. 733,499

2 Claims. (Cl. 217—26)

The invention relates to an egg crate packing device and more especially to egg handling buckets or baskets.

The primary object of the invention is the provision of a device of this character, wherein a bucket or basket is constructed to accommodate racks which are removable therefrom and these supporting flats and fillers for eggs, while fitted within the said bucket or basket are suspension members so as to hold the contents of the bucket or basket, namely, eggs, when placed upon the flats and within the fillers, whereby such contents can be packed within an egg crate in a convenient manner without requiring labor for so doing.

Another object of the invention is the provision of a device of this character, wherein the construction thereof is novel in form, so that eggs can be stacked with their fillers and flats in true order within an egg crate and by reason of the construction of the handling bucket or basket the eggs as contained upon the flats and within the fillers will be ventilated for cooling purposes.

A further object of the invention is the provision of a device of this character which is simple in its construction, readily and easily handled, thoroughly reliable and efficient in its purposes, light in weight, yet strong, durable, and inexpensive to manufacture.

With these and other objects in view, the invention consist in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a vertical sectional view through a device constructed in accordance with the invention and showing eggs supported by the flats and within the fillers therefor.

Figure 2 is a fragmentary vertical sectional view through an egg crate showing the device placed therein and the contents of the bucket or basket of said device partially pulled from the crate, with the eggs properly held within the crate.

Figure 3 is a top plan view of the device as shown in Figure 1.

Figure 4 is a bottom plan view thereof.

Figure 5 is a perspective view of one of the racks.

Figure 6 is a fragmentary perspective view showing one of the suspension straps released from the bucket or basket.

Similar reference characters indicate corresponding parts throughout the several views in the drawing.

Referring to the drawing in detail, A designates generally a portion of an egg crate which is of standard construction having the interior partition B for providing stacking spaces for eggs within said crate.

The egg packing or handling device embodying the present invention comprises a bucket or basket 10 preferably made from sheet metal and of squared formation, the body of the said bucket or basket being provided with transverse rows of perforations 11 in opposed side walls thereof and these being for ventilating purposes and also for the purpose hereinafter described. The rows of perforations are spaced the required distance apart in a vertical direction and selected perforations 11 are adapted to accommodate the legs 12 of substantially U-shaped racks 13, these being removably inserted in said selected perforations to constitute rests for egg flats 14 and fillers 15, respectively, the perforations 11 receiving the legs 12 of the racks being in a plane so as to not interfere with the fillers 15 when the same are arranged superposed with respect to each other within the bucket or basket 10, as is clearly shown in Figure 1 of the drawing. Each flat has stamped or struck upwardly therefrom the upstanding concaved seats 16 for the wider ends of eggs 17 when placed within the fillers 15 so as to hold the eggs centered within the pockets 18 formed by the fillers 15 and at rest therein.

Provided at the upper corners of the bucket or basket 10 are hooks 19, the said bucket or basket being open at its top and bottom, and engageable with these hooks are suspension straps 20, each being provided with the eyelets 21 for accommodating the hooks 19 so that the said straps 20 at opposite ends thereof can be engaged on the hooks 19 and in their engagement the straps 20 will be disposed in diagonally crossed relation to each other. These straps are adapted to be trained beneath the lowermost flat 14 of the series after the placing of such flat within the bucket or basket 10 and also the fillers 15 properly related therewith for stacking purposes both of said fillers and eggs as nested within the latter.

It will appear that there is one rack 13 for each flat and filler in their stacked relation as placed within the bucket or basket 10.

At the upper open end of the bucket or basket 10 is a swinging handle 22 for the convenient carrying of said bucket or basket.

In the use of the bucket or basket for egg crate packing or egg handling, the straps 20, which are flexible and preferably made from leather, have their eyelets 21 engaged on the hooks 19 for their disposition in crossed diagonally disposed relation to each other for suspension within the bucket or basket 10, it being understood, of course, that a rack 13 is inserted in the perforations 11 at the lowermost point of the bucket or basket, so that the crossed stretches of the said straps 20 will rest upon this rack. Thereafter a flat 14 is superimposed upon the said rack and also a filler 15 placed upon this flat 14. Thereafter the eggs 17 are placed within the pockets of this filler 15. Then another rack 13 is engaged in the perforations 11 immediately above the lowermost filler and the placing of another flat and filler is had within the bucket or basket and this operation is repeated until the bucket or basket has been completely filled with eggs 17, they being stacked within said bucket or basket. Thereafter the bucket or basket as filled is placed within a space accommodating the same within the crate A. To release the contents of the filled bucket or basket 10 as placed within the crate A for the packing of the latter, the straps 20 are detached from the hooks 19 and this frees the bucket or basket that can be pulled outwardly from the crate, as exampled in Figure 2 of the drawing, it being understood, of course, that prior to the insertion of the bucket or basket 10 into the crate, the racks 13 in all are removed from the said bucket or basket and during this the flats 14 settle upon the fillers 15 immediately beneath the same. On the removal of the bucket or basket 10 from the crate A, the straps are pulled from about the stacked flats and fillers including the eggs and thus properly stacked and packed within the said crate. The operation as before described is successively carried forth until the crate has been completely packed.

The handle 22 permits of convenient handling of the bucket or basket 10 when being filled and also for the placement thereof within the crate A, as before set forth.

What is claimed is:

1. In a device of the kind described, a bucket provided with vertically spaced transverse rows of perforations, a removable filler fitting the bucket and having flats provided with egg seats and U-shaped members having legs slidably fitting in selected perforations of the rows with the legs supporting the flats.

2. In a device of the kind described, a bucket provided with vertically spaced transverse rows of perforations, a removable filler fitting the bucket and having flats provided with egg seats, U-shaped members having legs slidably fitting in selected perforations of the rows with the legs supporting the flats and straps arranged crosswise of each other beneath the bottom of the filler and trained upwardly between the latter and the bucket and separably connected with said bucket at its upper end.

ORREL DE LANGE.